United States Patent [19]
Yamamoto

[11] Patent Number: 5,765,075
[45] Date of Patent: Jun. 9, 1998

[54] TEMPERATURE SENSOR AND METHOD AND APPARATUS FOR USING THE TEMPERATURE SENSOR AND FIXING APPARATUS IN COMBINATION WITH A TEMPERATURE SENSOR

[75] Inventor: Syozo Yamamoto, Ebina, Japan

[73] Assignee: Fuji Xerox Co., Ltd., Tokyo, Japan

[21] Appl. No.: 712,350

[22] Filed: Sep. 11, 1996

[30] Foreign Application Priority Data

Sep. 14, 1995 [JP] Japan ............................ 7-262450

[51] Int. Cl.$^6$ ............... G01K 13/08; G01K 1/16; G01K 1/14; G03G 15/20
[52] U.S. Cl. ............... 399/69; 399/328; 374/141; 374/153; 374/120
[58] Field of Search ................ 374/153, 120, 374/208, 141; 399/69, 70, 328

[56] References Cited

U.S. PATENT DOCUMENTS

| | | | |
|---|---|---|---|
| 4,265,117 | 5/1981 | Thoma et al. | 374/179 |
| 4,321,828 | 3/1982 | Grimes et al. | 374/153 |
| 4,441,827 | 4/1984 | Coderre | 374/153 |
| 5,281,793 | 1/1994 | Gavin et al. | 374/153 |
| 5,321,481 | 6/1994 | Mathers | 399/69 |
| 5,366,291 | 11/1994 | Nakagama et al. | 374/153 |
| 5,475,200 | 12/1995 | Amico et al. | 374/153 |
| 5,557,385 | 9/1996 | Tanaka et al. | 399/69 |
| 5,570,171 | 10/1996 | Kusumoto et al. | 399/328 |
| 5,621,512 | 4/1997 | Uehara et al. | 399/328 |

FOREIGN PATENT DOCUMENTS

| | | | |
|---|---|---|---|
| 0058578 | 5/1977 | Japan | 374/153 |
| 0131081 | 11/1978 | Japan | 374/153 |
| 0151231 | 11/1980 | Japan | 374/134 |
| 0010425 | 1/1982 | Japan | 374/208 |
| U-57-19612 | 2/1982 | Japan . | |
| B2-58-33492 | 7/1983 | Japan . | |
| 0044633 | 3/1984 | Japan | 374/153 |
| U-60-181768 | 12/1985 | Japan . | |

*Primary Examiner*—Diego F. F. Gutierrez
*Attorney, Agent, or Firm*—Oliff & Berridge PLC

[57] ABSTRACT

A temperature sensor which contacts with a curved-surface body to be measured to sense a temperature thereof is provided with a support member having a bow-shaped surface; a thin film strung and laid between both ends in a direction of curvature (e.g., bow-shaped direction) of the bow-shaped surface; and a heat sensitive element disposed at a portion of the thin film. The portion being opposed to the bow-shaped surface. Also, the space portion side of the heat sensitive element may be coated with aluminum foil and a protect plate formed of aluminum, phosphorous bronze or copper is disposed on the body to be measured side of the heat sensitive element. Further, the temperature sensor may be incorporated in an apparatus that fixes the temperature sensors to the bow-shaped surface.

14 Claims, 15 Drawing Sheets

TEMPERATURE SENSOR AND METHOD AND APPARATUS FOR USING THE TEMPERATURE SENSOR AND FIXING APPARATUS IN COMBINATION WITH A TEMPERATURE SENSOR

BACKGROUND OF THE INVENTION

1. Field of Invention

The present invention relates to a temperature sensor, a method for using the same, and an apparatus in which the temperature sensor is fixed. In particular, the present invention relates to an improvement in a temperature sensor of a type that touches a curved-surface body to be measured such as a heating roller of a fixing apparatus to sense the temperature thereof, a method for using the sensor, and an apparatus in which the temperature sensor is fixed.

2. Description of Related Art

Generally, in an image forming system such as a copying machine which employs an electrophotographic technique, there is normally provided a fixing apparatus of a heating type in order to fix a toner image transferred onto a recording sheet (a recording member).

Conventionally, as a fixing apparatus of this type, there is known a fixing apparatus which includes a heating roller and a pressurizing roller respectively rotatable in mutual contact with each other and in which a recording sheet with an unfixed toner image formed thereon is inserted between these two rollers to thereby fix the unfixed toner image.

In this type of fixing apparatus, normally, in order to keep a fixing temperature constant, a technique which controls the temperature of a heating source for the heating roller to keep a fixing condition constant is employed. When this kind of technique is employed, there is a temperature sensor which senses the surface temperature of the heating roller.

In a conventional temperature sensor of this type, as shown in FIG. 25, a sensor unit 110 in contact with a heating roller 101, serving as a body to be measured, is mounted in the sensor mounting portion of a sensor holder (not shown). At this sensor unit 110, a sensor unit in which a hollow elastic body 112 is held in a hold member 111 is employed. A heat sensitive element 113 such as a thermistor is disposed on the surface of the hollow elastic body 112 on the heating roller 101 side. The heat sensitive element 113 is coated with a protect sheet 114 formed of polyimide (for example, Japanese Patent Examined Publication (kokoku) No. Sho58-33492). In FIG. 25, a pressurizing roller 102 to be pressure contacted with the heating roller 101 is shown. A heating lamp 103 is incorporated in the heating roller 101 is also shown.

Also, as a further example of the sensor unit 110 of the conventional temperature sensor, as shown in FIG. 26, there is known a sensor unit in which a heat sensitive element 113 such as a CA thermocouple or a thermistor is disposed on the back surface side of a thin film sheet 121. A surface layer 122 formed of fluororesin having a low coefficient of friction is disposed on the front surface side of the thin film sheet 121 for smooth contact with the body to be measured such as the heating roller 101. A sheet-shaped sponge elastic body 124 is provided on a U-channel shaped support member 123 and the thin film sheet 121 is pushed elastically toward the heating roller 101 side (for example, Japanese Utility Model Examined Publication No. Sho57-19612).

The above-mentioned conventional temperature sensor is advantageous in that, due to provision of the hollow elastic body 112 and sheet-shaped sponge elastic body 124, it is able to sense the surface temperature of the heating roller 101 accurately and is difficult to be influenced by variations in the environment temperature.

However, since the hollow elastic body 112 includes a space portion therein, the thickness direction dimension is increased accordingly. In this case, if the heating roller 101 is rotated, the hollow elastic body 112 is pulled along the rotation direction of the heating roller 101 so that it can be easily deformed. To prevent this, it is necessary that the side surface of the hollow elastic body 112 is held by the hold member 111 having rigidity.

Therefore, the size of the hollow elastic body 112 itself becomes large and is necessary to provide the hold member for holding the hollow elastic body 112. This makes it difficult to reduce the size of the whole of the temperature sensor.

Also, when the surface temperature of the heating roller 101 is detected by the heat sensitive element 113, the heat of the heating roller 101 is taken by the support member (hollow elastic body 112, hold member 111) of the heat sensitive element 113 so that the sensing temperature of the heat sensitive element 113 cannot be stabilized until the temperature sensor becomes uniform in temperature as a whole. In this case, if the heat capacity of the whole of the support member is large, then there is accordingly increased time for the whole temperature sensor to become uniform in temperature. Thus, the temperature sensing performance of the heat sensitive element 113 is not able to follow a sudden change in temperature. That is, in the conventional temperature sensor, there is still a technical problem to be solved.

On the other hand, in the conventional temperature sensor of the latter type, while the temperature sensor itself can be made compact when compared with the former type, the heat capacity of the sheet-shaped sponge elastic body 124 (since it has elasticity in the thickness direction thereof, it requires a certain degree of thickness) is large and a technical problem to be solved still exists, i.e., the temperature sensing performance of the heat sensitive element 113 is not able to follow a sudden change in temperature.

As means for solving the above technical problems, as shown in FIG. 27, there is provided a temperature sensor in which a pair of leg pieces of a U-channel shaped support member 131 are structured in the form of elastic leg pieces 132 which can be elastically deformed. A heat resisting film 133 for holding the heat sensitive element 113 such as a thermistor therein is provided across the leading ends of the elastic leg pieces 132 of the support member 131. The heat resisting film 133 is brought into elastic contact with a body to be measured such as the heating roller 101. Or, as shown in FIG. 28, there is provided a temperature sensor in which a plate spring 142 is supported in a fixed plate 141 in a cantilevered manner, a heat resisting film 133 for holding the heat sensitive element 113 such as a thermistor therein is provided between the fixed plate 141 and the free end of the plate spring 142 and the heat resisting film 133 is brought into elastic contact with a body to be measured such as the heating roller 101 (for example, Japanese Utility Model Unexamined Publication No. Sho. 60-181768).

According to this type of temperature sensor, since the heat resisting film 133 is brought into close contact with the heating roller 101 due to the elastic action of the elastic leg pieces 132 of the support member 131 or due to elastic action of the plate spring 142, the surface temperature of the heating roller 101 can be sensed accurately by the heat sensitive element 113. Also, because the heat resisting film 133 is only the member that supports the heat sensitive element 113 and the present heat resisting film 133 is formed as a thin film and is very small in heat capacity, the quantity of heat transmitted from the heat sensitive element 113 to the heat resisting film 133 is quite small and thus the temperature sensing performance of the heat sensitive element 113 is able to follow a sudden change in temperature quickly.

However, in this type of temperature sensor, when the body to be measured such as the heating roller 101 is rotated and an air flow is generated in the periphery thereof, there occurs a phenomenon that the air flow can pass through the space portion 134 easily. That is, due to such air flow, the heat of the heat sensitive element 113 becomes easy to be taken so that the temperature sensing performance of the heat sensitive element 113 is easy to vary according to the peripheral environment. In other words, there is still left a technical problem to be solved.

In particular, in the above-mentioned temperature sensor, for example, as shown in FIG. 27, the heat that is radiated from the back surface of the heat sensitive element 113 and the heat that has passed through the heat resisting film 133 from the heating roller 101 are radiated into the space portion 134 defined by the heat resisting film 133 and its support member 131 in such a manner as shown by an arrow X.

On the other hand, in the temperature sensor of the type shown in FIG. 28, the heat radiated to the back surface side of the heat sensitive element 113 is in part reflected by the plate spring 142 in such a manner as shown by an arrow Y and is thus returned back to the heat sensitive element 113 side. Most of the heat radiated is radiated within the space portion 134 defined by the heat resisting film 133 and its support members 141, 142 in such a manner as shown by an arrow X.

Therefore, in the temperature sensors respectively shown in FIGS. 27 and 28, it is inevitable that the response performance of the heat sensitive element 113 is lowered according to the heat loss due to the above-mentioned heat radiation.

The above-mentioned inconvenience occurs not only in the temperature sensor for use in a fixing apparatus but also in a general temperature sensor which is used to sense the temperature of a body to be measured including a curved surface.

SUMMARY OF THE INVENTION

It is an object of the invention to provide a temperature sensor which can prevent a body to be measured from being damaged, can be made compact in size, can keep good temperature followability with respect to a sudden change in temperature, and can effectively control the deterioration of the temperature followability of a heat sensitive element due to variations in the peripheral environment, a method for using the same temperature sensor and a fixing apparatus using the same temperature sensor.

A temperature sensor according to the present invention which contacts with a curved-surface body to be measured for sensing the temperature of the body, comprises a support member having a bow-shaped surface; a thin film strung and laid between both ends in a bow shape direction of the bow-shaped surface; and a heat sensitive element disposed at a portion of the thin film, the portion being opposed to the bow-shaped surface.

This temperature sensor may be incorporated in a fixing apparatus.

According to the invention, a thin film is strung and laid between a support member and a bow-shaped surface through a space portion. A heat sensitive element is disposed on the space portion side of the thin film. The thin film is brought into contact with a body to be measured thereby keeping the heat sensitive element in good contact with the body to be measured. Accordingly, there is eliminated the need for provision of a hollow elastic body and a hold member for holding the hollow elastic body which are conventionally used, thereby being able to reduce the size of the whole of the temperature sensor.

Also, since the support member that supports the heat sensitive element is the thin film itself, the space portion can be expected to provide a heat insulating effect. Further, there is little possibility that the heat of the heat sensitive element can be transmitted in the surface direction through the thin film. For these reasons, when compared with the hollow elastic body or sheet-shaped elastic body and a member for supporting such elastic body which are employed in the conventional temperature sensor, it is possible to reduce greatly the heat capacity of a member to which the heat from the heat sensitive element is transferred, which accordingly makes it possible to keep the good temperature followability of the heat sensitive element with respect to the sudden temperature change of the body to be measured.

DETAILED DESCRIPTION OF PREFERRED EMBODIMENTS

Detailed description of the present invention will be described as follows with reference to the accompanying drawings.

Figure 1:
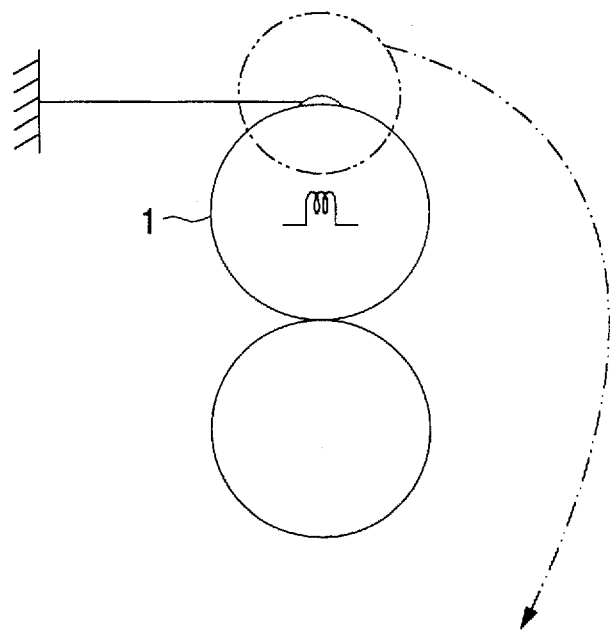
FIG. 1 is an explanatory view of the structure of a temperature sensor according to the invention.
Figure 1:
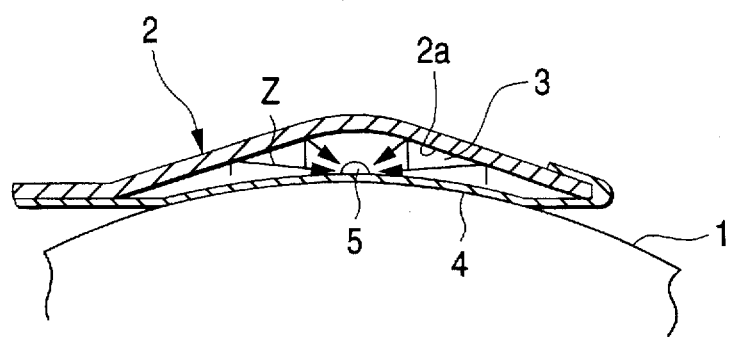

FIG. 1 shows a temperature sensor arranged so that it contacts a body 1 having a curved surface shape. The temperature sensor senses the temperature of the body 1. The temperature sensor comprises a support member 2 including a bow-shaped surface 2a, a thin film 4 which is strung and laid between both ends in the direction of the curvature or bend (e.g., bow direction) of the bow-shaped surface 2a, and a heat sensitive element 5 provided on the surface of the thin film 4 opposed to bow-shaped surface 2a.

Preferably, when using the present temperature sensor, only the thin film 4 portion containing the heat sensitive element 5 area is brought into contact with the body 1 to be measured, whereas the body 1 to be measured and the support member 2 may be positioned such that they are not in contact with each other.

According to the above-mentioned technique, in a temperature sensor according to the invention, as the body 1 to be measured, there can be used all kinds of members which have a curved surface shape requiring temperature detection. For example, in a fixing apparatus for use in an image forming system employing an electrophotographic technique, the body 1 to be measured is normally a heating roller in which a heating source is built. However, this is not a limitation. A pressurizing roller to be pressure contacted with the heating roller may also be used as the body 1 to be measured. Also, besides the fixing apparatus, as the body 1 to be measured, there can be used a wide range of curved surface shaped rollers and shafts requiring temperature detection such as a shaft provided in a heater for feeding hot wind, a shaft connecting an engine with a generator, and the like.

Also, the support member 2 may be a rigid member itself or an elastically deformable member so that it includes a bow-shaped surface 2a. That is, the support member 2 may be selected properly according to cases.

The term "bow-shaped surface 2a" means a portion having a so called bow-like shape which is opposed to the heat sensitive element 5, and it includes a wide range of shapes such as a portion having an angular section, a portion having a smoothly curved surface, and other portions having similar shapes (such as a portion having a trapezoidal section and the like). For example, a plate-shaped support member 2 is bent to from the bow-shaped surface 2a, but it is not necessary that the outer shape of the supporting member 2 is formed to be bow shape.

Further, the shape of the bow-shaped surface 2a may preferably be selected from the viewpoint of the fact that the inner surface shape of the bow-shaped surface 2a can reflect heat radiated into the space portion 3 and the thus reflected heat can be centralized onto the heat sensitive element 5 of the thin film 4 efficiently. Especially, a bow-shaped surface 2a having a smoothly curved surface shape is preferred. Further, it is not a problem that the shape of the bow-shaped surface 2a is symmetrical or unsymmetrical.

Moreover, the shape of the bow-shaped surface 2a may be formed so that it is curved in at least one direction. However, it may be formed to be curved in optimum two or more directions. Ultimately, the bow-shaped surface 2a may be bowl-shaped surface in which it forms the bow-shaped surface 2a in optimum whole directions. From the Figures, it is shown that the support member 2 is in substantial contact with the curved surface, regardless of a pressure applied to the support member 2.

Referring to the thin film 4, the material of the thin film may be selected properly according to cases so that it has heat resistance with respect to the measuring temperature range of the body 1 to be measured.

Here, from the viewpoint of the fact that the heat sensitive element 5 is set positively at a proper position with respect to the body 1 to be measured, it is preferable to use an elastic thin film having elasticity in the surface direction thereof as the thin film 4. In this case, the mounting error of the support member 2 can be absorbed by the elastic action of the elastic thin film, while the portion of the elastic thin film corresponding to the heat sensitive element 5 is always arranged in close contact with the body 1 to be measured. Preferably, the heat sensitive elements are located substantial at a center of the thin film. However, instead of use of the elastic thin film, the bow-shaped surface 2a of the support member 2 may be arranged such that it can exert an elastic action.

The elastic thin film, normally, may be formed of elastic material having a heat resisting property. However, even in the case of elastic material having no heat resisting property, it can be used, provided that a heat resisting coat layer is put on the surface thereof.

Also, when taking account of the heat transfer rate (the sensitivity of the heat sensitive element 5) of the thin film 4 to the heat sensitive element 5, the thickness of the thin film 4 is preferably 50 μm or less. When taking account of the strength limit thereof, the thickness is preferably 25 μm or more. When taking account of both of them, the thickness is preferably in the range of 25 to 50 μm.

Further, the heat sensitive element 5 is provided at a portion where the reflected heat from the bow-shaped surface 2a is collected so as to correspond to the shape of the bow-shaped surface 2a.

Referring to the distance of the space portion 3 extending between the heat sensitive element 5 and the bow-shaped surface 2a of the support member 2, if it is less than 1 mm, a heat insulating effect to be provided by the air layer of the space portion 3 is liable to be insufficient. on the other hand, if it exceeds 5 mm, the space portion 3 becomes excessively wide and thus the quantity of peripheral air flow entering the space portion 3 increases, so that the heat of the heat sensitive element 5 can be taken easily in a large quantity. Therefore, the above-mentioned distance may be preferably set in the range of 1 to 5 mm.

However, the space portion 3 may also be formed as a substantially closed space so that the air flow cannot enter it.

Also, the heat sensitive element 5 may be selected according to cases from a thermocouple, a thermistor and the like, which is able to sense the temperature of the body 1 to be measured.

In this case, in order to maintain a good sensitivity of the heat sensitive element 5, it is preferred that the side surface of the heat sensitive element 5 on the body I to be measured may be formed in a flat surface.

Further, referring to a method for mounting the heat sensitive element 5 onto the thin film 4, the heat sensitive element 5 may be bonded to the thin film 4 by use of adhesives or tape, or a heat sensitive element 5 mounting portion may be formed integrally with the thin film 4 itself.

Also, from the viewpoint of the fact that radiation of heat from the heat sensitive element 5 can be restricted further, it is preferred that the space portion 3 side of the heat sensitive element 5 may be coated with a thermal conductive sheet such as aluminum foil.

Further, from the viewpoint of the fact that the life of the temperature sensor can be extended further without sacrificing the response performance of the heat sensitive element 5, preferably, the heat sensitive element 5 may be fixedly secured to the thin film 4 through a thermal conductive sheet (protect plate) which is formed of aluminum, phosphorous bronze or copper.

From the viewpoint of the fact to improve the response performance of the heat sensitive element 5, it is necessary to reduce the heat capacity of the heat sensitive element 5 and thin film 4 as much as possible. In the present invention, preferably, the total of the heat capacity of not only the heat sensitive element 5 and thin film 4, that is, the contact portions thereof in contact with the body 1 to be measured, but also a metal member (that is, a thermal conductive sheet such as aluminum foil, aluminum, phosphorous bronze, or copper) in contact with the heat sensitive element 5, if present, may be 0.04 J/°C. or less.

Further, the present invention also relates to a fixing apparatus (such as a fixing apparatus and the like) including the curved surface body 1 to be measured used as a temperature sensing target, in which a temperature sensor according to the invention is incorporated.

In this case, as the temperature sensor to be incorporated, there are included all of the above-mentioned various kinds of embodiments.

According to the above-mentioned techniques, when setting the sensor unit (support member 2, thin film 4, and heat sensitive element 5) on the body I to be measured, only the thin film 4 portion including the heat sensitive element 5 area may be contacted with the body 1 to be measured and thus the body I to be measured and support member 2 may be disposed in such a manner that they are not in contact with each other.

In this case, the contact condition between the heat sensitive element 5 portion and the body 1 to be measured can be maintained and the heat of the body I to be measured can be transferred to the heat sensitive element 5 quickly.

Also, the dimension of the sensor unit in the thickness direction may be set substantially in correspondence to the space portion 3 area. Thus, if the space portion 3 area is set narrower to some extent, the above dimension can be reduced when compared with the conventional sensor unit (a type using a hollow elastic member and a hold member).

Further, since the heat capacity of the thin film 4 in contact with the heat sensitive element 5 is small, the heat of the heat sensitive element 5 can be slightly transferred to the support member 2 through the thin film 4. This eliminates the possibility that the heat taken from the heat sensitive element 5 can be transferred to the support member 2 side unnecessarily.

Because the support member 2 includes the bow-shaped surface 2a and the heat sensitive element 5 is provided at a portion opposed to the bow-shaped surface 2a at the space 3 side of the thin film 4, the heat coming from the back surface of the heat sensitive element 5 and the heat having passed through the thin film 4 from the body 1 to be measured are radiated into the space portion 3. Whereas most of the present radiated heat, as shown by an arrow Z in FIG. 1, is reflected by the inner surface of the bow-shaped surface 2a and is returned back toward the heat sensitive element 5 side collectively.

This eliminates the possibility that the heat radiated into the space portion 3 can be radiated wastefully as it is, so that the heat can be used efficiently as the heat for sensing the temperature of the heat sensitive element 5.

Now, description will be given below in detail of the invention with reference to the embodiments thereof respectively shown in the accompanying drawings.

First Embodiment

Figure 2:
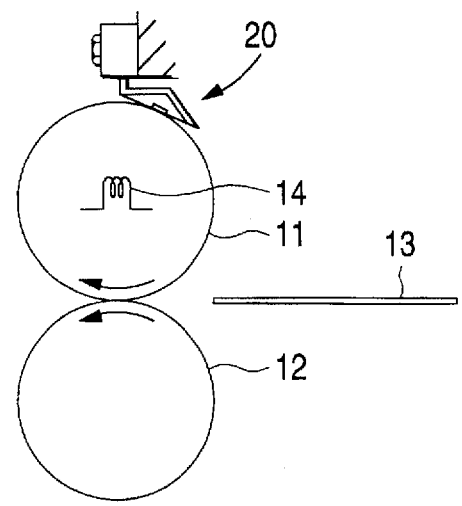
FIG. 2 is an explanatory view of the structure of a fixing apparatus according to a first embodiment of the invention.

FIG. 2 shows a first embodiment of a temperature sensor of a fixing apparatus to which the invention is applied. In FIG. 2, the fixing apparatus includes a heating roller 11 and a pressuring roller 12 which are respectively rotated in contact with each other, the roller 12 is coated with elastic material. In the fixing apparatus, a recording sheet 13 with an unfixed toner image formed thereon is inserted between the two rollers 11 and 12 to thereby fix the unfixed toner image. A heating lamp 14 (heater) is incorporated in the heating roller 11.

Figure 3:
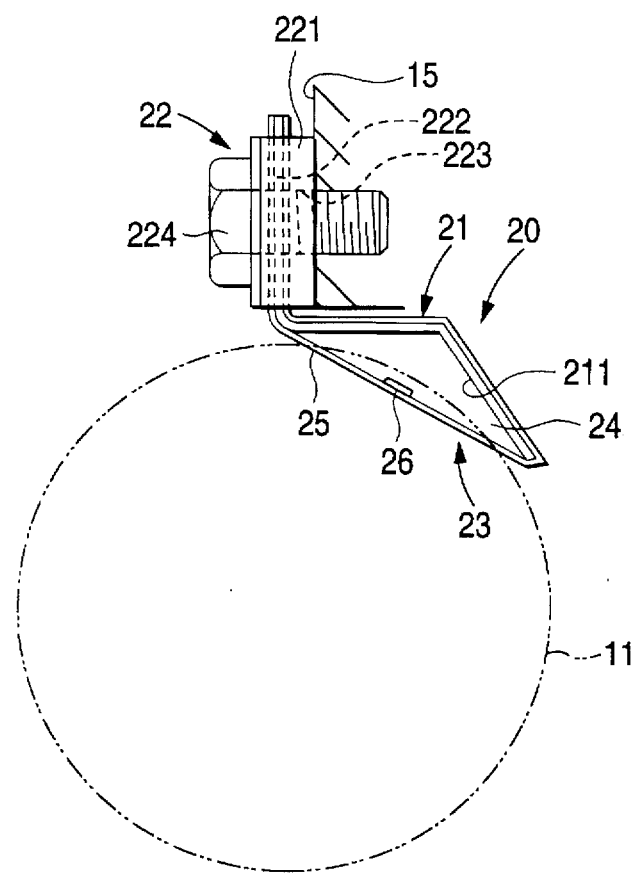
FIG. 3 is an explanatory view of the details of a temperature sensor employed in the fixing apparatus according to the first embodiment of the invention.

FIG. 3 shows the details of a temperature sensor 20 used in the present embodiment.

The temperature sensor 20 includes a base end of a sensor holder 21. The base end comprises a rigid plate mounted on a given fixing portion 15 through a fitting member 22 and a sensor unit 23 is mounted on the sensor holder 21.

Figure 4A:
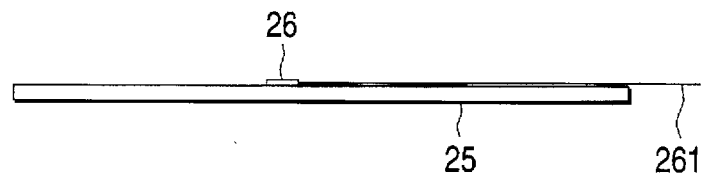
FIG. 4A is an explanatory front view of an elastic thin film and a heat sensitive element, showing a position relationship between them.

The sensor unit 23 includes a bow-shaped surface 211 having a section of an isosceles triangle (a conical shape) is formed in the sensor holder 21. An elastic thin film 25 capable of deforming elastically is strung and placed on the bow-shaped surface 211 along the surface direction thereof in such a manner that a space portion 24 is formed within the bow-shaped surface 211. As shown FIGS. 4A and 4B, a heat sensitive element 26 formed by deforming a CA thermocouple to a flat shape is bonded by heat resisting adhesives to the back surface of the elastic thin film 25. In particular, at the position opposed to the apex (axially symmetric position) of the bow-shaped surface 211. A lead wire 261 of the heat sensitive element 26 is also shown.

The elastic thin film 25 covers the front surface and back surfaces (except for the space portion 24) of the sensor holder 21. On the other hand, the fitting member 22 is structured so that in a main body 221 of the fitting member 22, there is an insertion slit 222 which extends in the horizontal direction and also into which the base end of the sensor holder 21 can be inserted. A screw insertion hole 223 is opened up to extend through the fitting member main body 221 in the vertical-direction thereof. The base end of the sensor holder 21 is inserted into the insertion slit 222, a mounting screw 224 is inserted through the screw insertion hole 223 of the fitting member main body 221 and the screw insertion hole of the sensor holder 21. The mounting screw 224 is thereby threadedly secured to a given fixing portion 15.

A phosphorous bronze plate, an SUS304CSP plate, an SK5M thermally processed plate, a bainite steel plate, other general metal plates (including a sintered metal plate, a cast metal plate, and an extruded metal plate), a resin plate, a ceramics plate and the like is used as the sensor holder 21. In the present embodiment a phosphorous bronze plate is preferably used.

A polyimide sheet, a teflon sheet, a glass cloth contained teflon sheet, a phosphorous bronze sheet, an SUS304CSP plate, an SK5M thermally processed plate, provided that they have a thickness in the range of 25 µm to 50 µm can be used as the elastic thin film 25. In the present embodiment, a polyimide sheet having a thickness of 25 to 50 µm is preferably used.

Figure 4B:
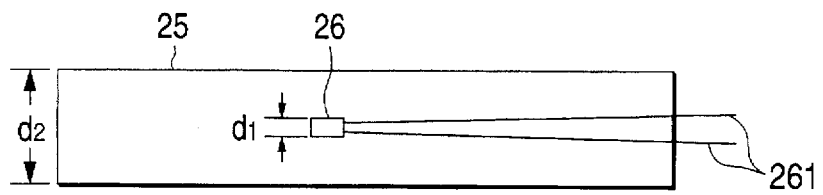
FIG. 4B is a plan view of the above-mentioned thin film and heat sensitive element.

Further, the width dimension $d_2$ of the elastic thin film 25, as shown in FIG. 4B, is set larger than several times the width dimension $d_1$ of the heat sensitive element 26. The heat capacity of the respective contact portions of the heat sensitive element 26 and elastic thin film 25 in contact with the body to be measured is set for 0.04 J/°C.

Figure 5:
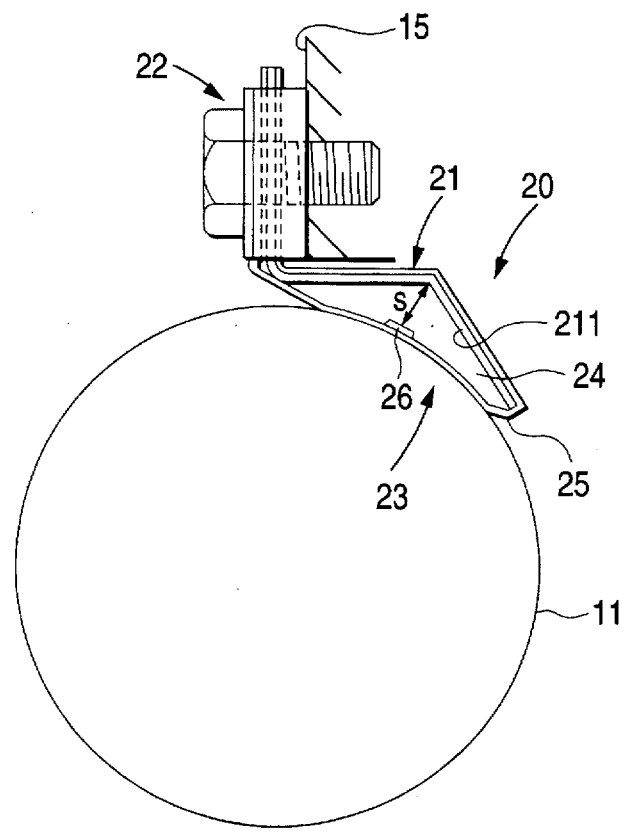
FIG. 5 is an explanatory view to show how to mount a temperature sensor according the first embodiment of the invention.

As shown in FIG. 5, the temperature sensor is mounted so that the periphery of the heating element 26 of the elastic thin film 25 of the sensor unit 23 is elastically fitted to the heating roll 11 to be measured.

In this mounting, the distance s of the space portion 24 between the heat sensitive element 26 of the space portion 24 and the bent portion of the bow-shaped surface 211 is set in the range of 1 to 5 mm.

Further, while the elastic thin film 25 is elastically spread and deformed along the shape of the surface of the heating roller 11, the elastic stress of the elastic thin film 25 is sufficiently small over the entire area. Therefore, a reaction caused by the elastic deformation of the elastic thin film 25 does not act so strongly on the heating roller 11 side that the sensor unit 23 can be mounted on the surface of the heating roller 11 in a width contact manner.

Here, when the performance of the temperature sensor was examined, it was confirmed that no damage is found on the surface of the heating roller 11, the temperature followability of the heat sensitive element 26 is good, and the temperature variations due to the peripheral environment can be controlled to a low level.

Figure 6:
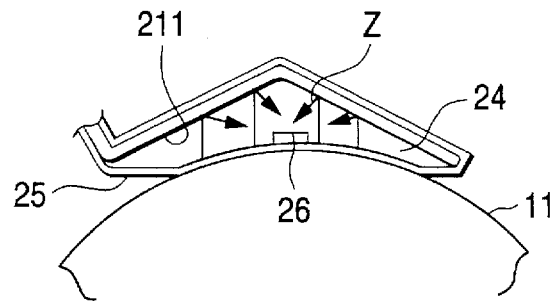
FIG. 6 is an explanatory view to show the operation of a bow-shaped surface provided in the temperature sensor according to the first embodiment of the invention.

This seems because, as shown by an arrow Z in FIG. 6, the heat that is released from the back surface of the heat sensitive element 26 and the heat that has passed through the elastic thin film 25 from the heating roller 11 are reflected within the space portion 24 by the inner surface of the bow-shaped surface 211. Afterwards, they are moved back again to the heat sensitive element 26 concentratedly. This reduces the loss of the heat given to the heat sensitive element 26.

Figure 7A:
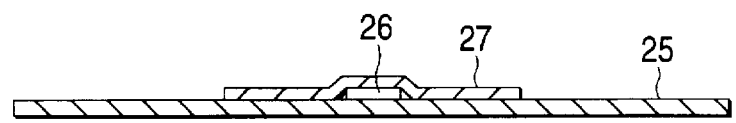
FIGS. 7A and 7B are respectively explanatory views of two mutually different modifications of a structure for mounting a heat sensitive element according to the first embodiment of the invention.
Figure 7B:
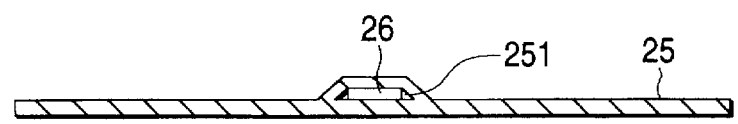

Also, the method for mounting the heat sensitive element 26 is not limited to the above-mentioned method using the heat resisting adhesives. As shown in 7A, the heat sensitive element 26 may be bonded by use of heat resisting adhesive tape 27. As shown in FIG. 7B, when the elastic thin film 25 is formed, a storage portion 251 for the heat sensitive element 26 may be formed integrally with the elastic thin film 25. The heat sensitive element 26 may then be inserted into and held in the storage part 251.

Figure 8A:
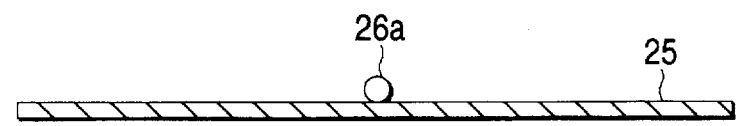
FIGS. 8A and 8B are respectively explanatory views of two mutually different modifications of a heat sensitive element according to the first embodiment of the invention.

Further, the heat sensitive element 26 is not limited to the above-mentioned heat sensitive element that is formed by collapsing the CA thermocouple into a flat shape. A normal thermocouple may be used. As shown in FIG. 8A, it is possible to use a bead type (including an SB type) of thermistor 26a, a thin film thermistor or the like.

Figure 8B:
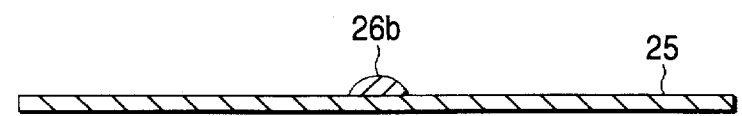

In this case, to satisfy the request that the bead type of thermistor 26a can be used with a slightly higher sensitivity (as shown in FIG. 8B), a bead type of thermistor 26b in which the side surface of the body to be measured thereof is formed in a flat surface may be used. To manufacture such thermistor, for example, when a bead type of thermistor is coated with glass, the glass may be pressed while it is being melted and then cooled.

Figure 9A:
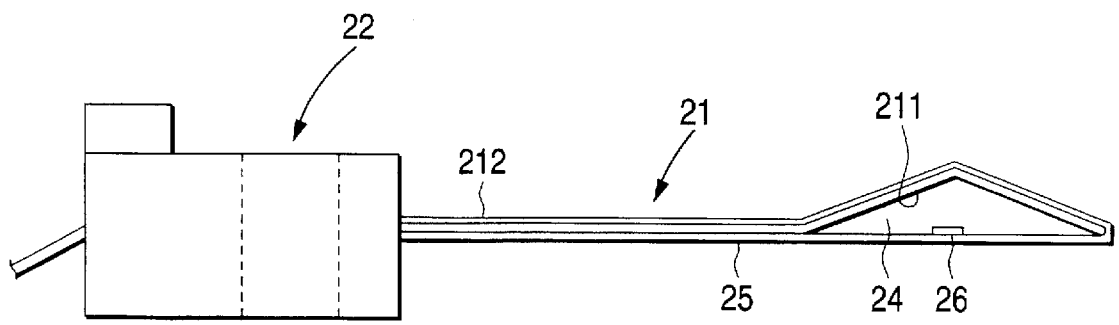
FIG. 9A is an explanatory front view of a modification of the temperature sensor according to the first embodiment.
Figure 9B:
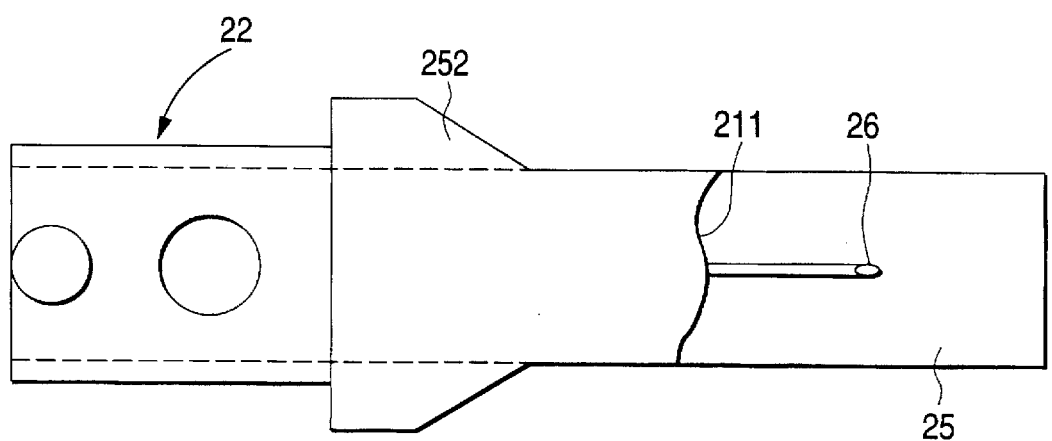
FIG. 9B is a partially broken plan view of the above modification.

Further, the shape of the sensor holder 21 can be changed properly according to the position relationship between its mounting position and a body to be measured. For example, as shown in FIGS. 9A and 9B, a bow-shaped surface 211 having a section of an isosceles triangle may be formed on the leading end side of the holder plate portion 212 shaped in a substantially straight line. Then the elastic thin film 25 may be provided in such a manner that a space portion 24 can be secured within the bow-shaped surface 211. The elastic thin film 25 covers the front surface and back surface (except for the space portion 24) of the sensor holder 21. Besides this, according to the present modification, the connecting piece portions 252 of the elastic thin film 25 are respectively provided on the front and back surfaces of the sensor holder 21. Then the connecting piece portions 252 are respectively connected to the sensor holder 21 to mount the elastic thin film 25 to the sensor holder 21.

Second Embodiment

Figure 10:
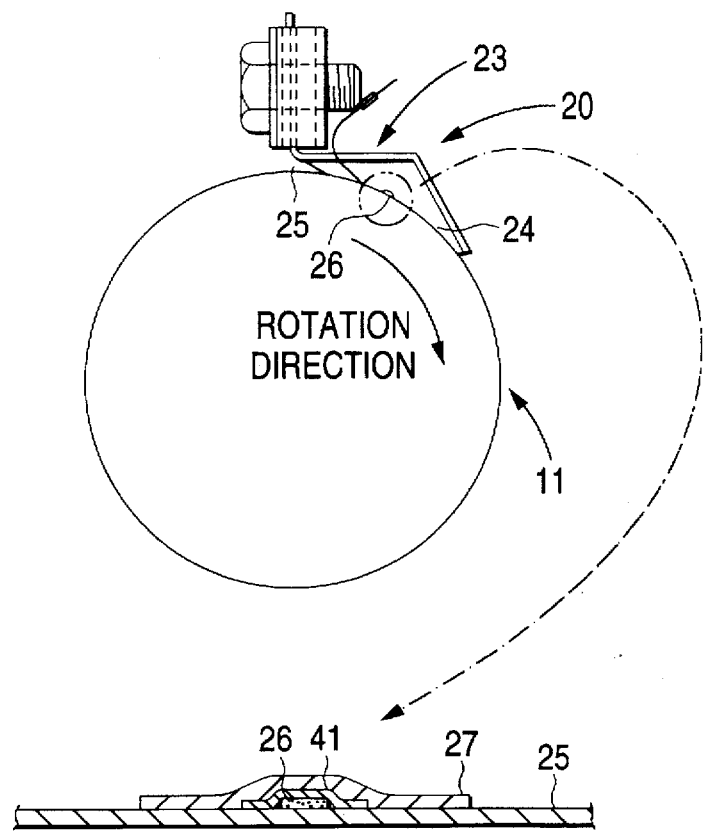
FIG. 10 is an explanatory view of a temperature sensor according to a second embodiment of the invention.

FIG. 10 shows a second embodiment of a temperature sensor according to the invention. In the second embodiment, the structure elements are similar to or equivalent to are employed in the first embodiment and are given the same reference numerals. Their descriptions are omitted here.

In FIG. 10, the basic structure of the temperature sensor according to the second embodiment is similar to that of the first embodiment. However, the space portion 24 side of the heat sensitive element 26 is coated with aluminum foil 41, while the heat sensitive element 26 and aluminum foil 41 are fixed by a heat resisting adhesive tape 27.

The second embodiment basically provides a similar operation to the first embodiment; however, the temperature followability of the heat sensitive element 26 is enhanced when compared with the first embodiment.

This is because the aluminum foil 41 exerts an action to return the heat radiated from the heat sensitive element 26 back to the heat sensitive element 26 side as radiant heat thereby reducing the loss of heat from the heat sensitive element 26.

Third Embodiment

Figure 11:
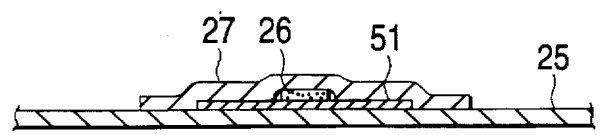
FIG. 11 is an explanatory view of the main portions of a temperature sensor according to a third embodiment of the invention.

FIG. 11 shows a third embodiment of a temperature sensor according to the invention FIG. 11 is an explanatory view of the main portions of the third embodiment. The structural components are similar to those employed in the first embodiment and are given the same reference numerals. The detailed description thereof is omitted here.

The body to be measured side of the heat sensitive element 26, includes a thermal conductive protect plate 51 which is formed of aluminum, phosphorous bronze or copper, while the heat sensitive element 26 and protect plate 51 are respectively fixed with heat resisting adhesive tape 27.

Due to this structure, it was confirmed that there is provided an action which is basically similar to the first embodiment, but also the life of the present temperature sensor is extended longer than the first embodiment.

This is because the protect plate 51 prevents a local pressure from acting on the heat sensitive element 26 thereby extending the life of the heat sensitive element 26.

Fourth embodiment

Figure 12:
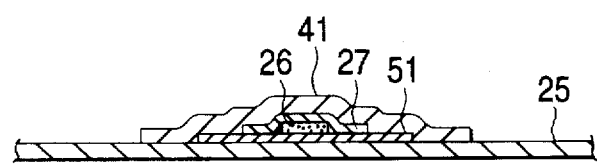
FIG. 12 is an explanatory view of the main portions of a temperature sensor according to a fourth embodiment of the invention.

FIG. 12 shows a fourth embodiment of a temperature sensor according to the invention. FIG. 12 is an explanatory view of the main portions of the second and third embodiment. The structural components are similar to those employed in the second and third embodiments and are given the same reference numbers. The detailed description thereof is omitted here.

In FIG. 12, the present temperature sensor is basically structured by combining the second embodiment with the third embodiment. In the present structure, the space portion 24 side of the heat sensitive element 26 is coated with aluminum foil 41. On the body to be measured side of the heat sensitive element 26, a protect plate 51 having thermal conductivity which is formed of aluminum, phosphorous bronze or copper is disposed. The heat sensitive element 26, aluminum foil 41 and protect plate 51 are respectively fixed with heat resisting adhesive tape 27.

Due to this structure, the temperature followability of the heat sensitive element 26 is enhanced and the life of the temperature sensor is extended.

In the first to fourth embodiments, various modifications are possible.

Fifth Embodiment

Figure 13:
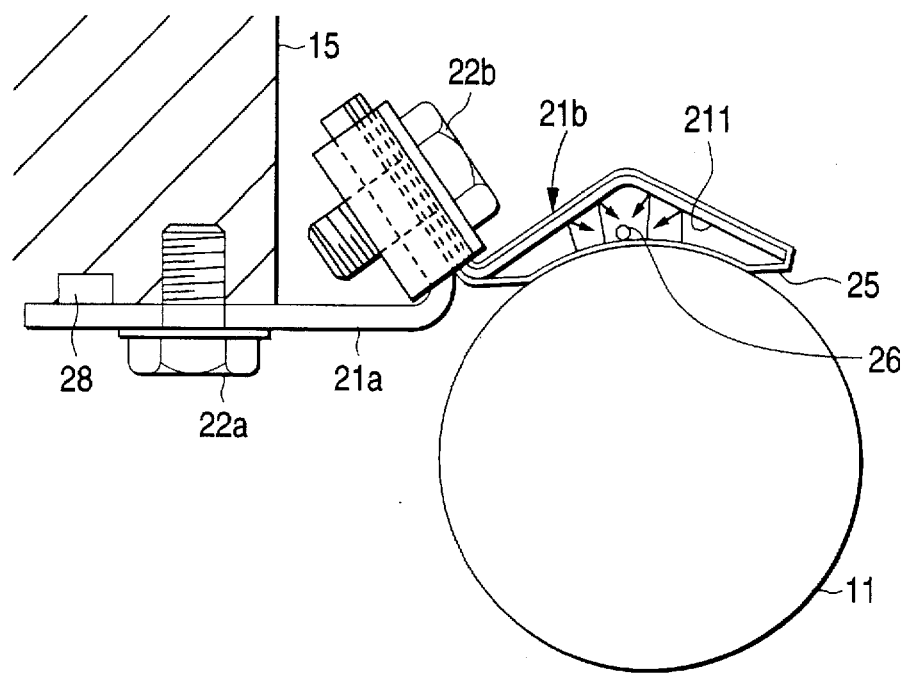
FIG. 13 is an explanatory view of a temperature sensor according to a fifth embodiment of the invention.

FIG. 13 is an explanatory view of a fifth embodiment of a temperature sensor according to the invention. In the fifth embodiment, the structural components are similar to those employed in the first embodiment and are given the same reference numerals. The detailed description thereof is omitted here.

In FIG. 13, the sensor holder 21 is composed of two separate units. The base end of a first holder unit 21a is fixed to a given fixing portion 15 through a fitting member 22a. A second holder unit 21b includes a bow-shaped surface 211 having a section of, for example, an angle shape, and the base end of the second holder unit 21b is connected and fixed to the leading end portion of the first holder unit 21a by means of a mounting member 22b. A positioning boss 28 which is used to prevent the rotation of the sensor holder 21 and also which can be fitted into a positioning recessed portion formed in a given fixing portion is shown.

According to this type of structure, since the sensor holder 21 is composed of the two separate holder units 21a and 21b, the first holder unit 21a can be fixed positively to the given fixing portion in such a manner that it is prevented against rotation, and the second holder unit 21b can be mounted in such a manner that the position thereof can be adjusted with respect to the first holder unit 21a.

Accordingly, the mounting position of the sensor holder 21 can be adjusted easily.

The second to fourth embodiments can be applied to the present embodiment.

Sixth Embodiment

Figure 14:
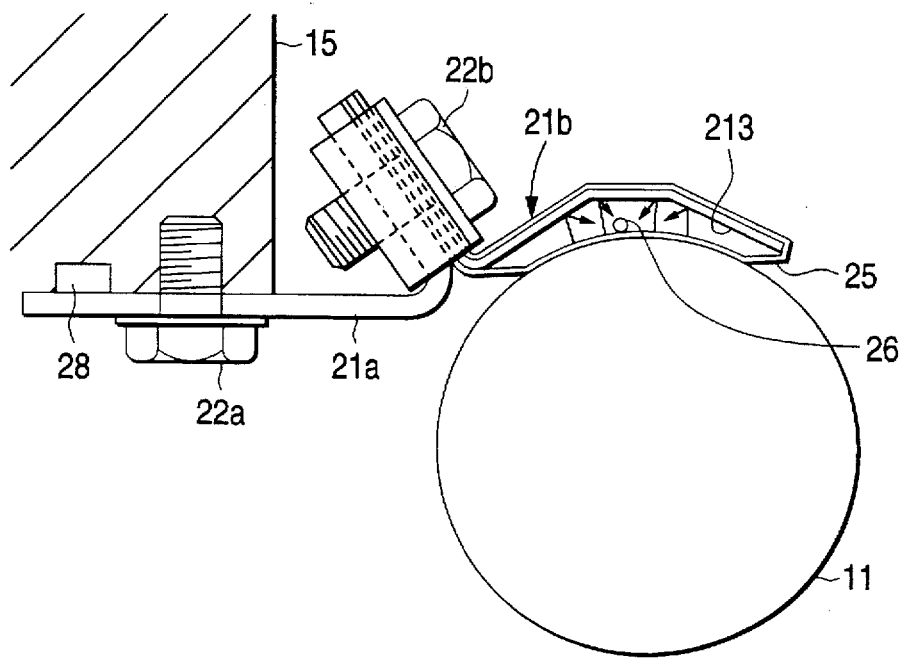
FIG. 14 is an explanatory view of a temperature sensor according to a sixth embodiment of the invention.

FIG. 14 shows a sixth embodiment of a temperature sensor according to the invention. The structural components are similar to those employed in the fifth embodiment and are given the same reference numerals. The detailed description thereof is omitted here.

In FIG. 14, the sensor holder 21 includes a bow-shaped surface 213 having a trapezoidal section not an angle shape section.

In this type of bow-shaped surface 213 an action which is substantially similar to the bow-shaped surface 211 having an angle shape section is provided.

Seventh Embodiment

Figure 15:
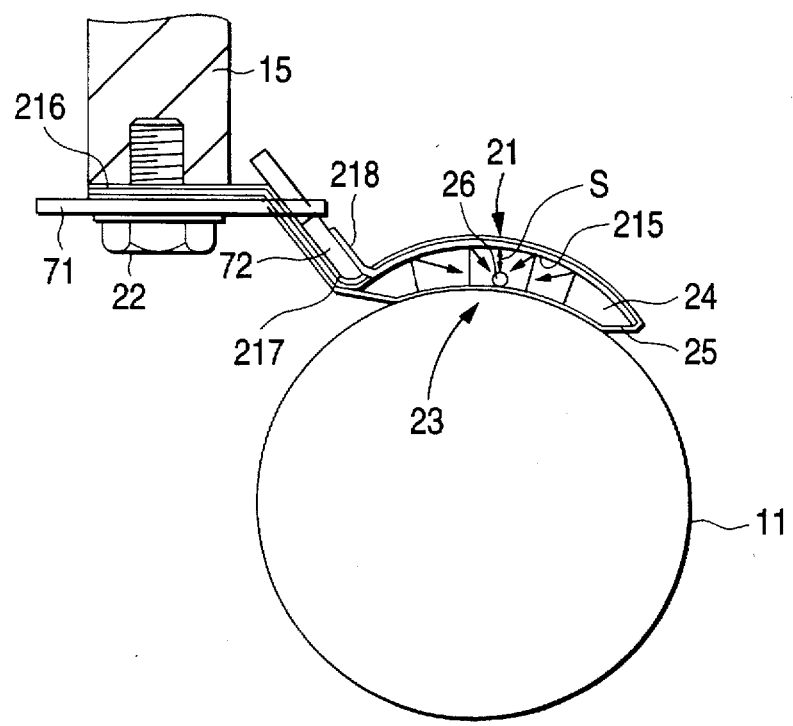
FIG. 15 is an explanatory view of a temperature sensor according to a seventh embodiment of the invention.

FIG. 15 shows a seventh embodiment of a temperature sensor according to the invention.

In FIG. 15, the basic structure of the present temperature sensor is similar to that of the first embodiment. The sensor holder 21 of the sensor unit 23. The manner of mounting the same can vary, however.

The sensor holder 21 includes on the leading end side a bow-shaped surface 215 having a smoothly curved surface (for example, a semi-elliptical surface). On the base end side thereof, a mounting portion 216 is formed. The bow-shaped surface 215 and mounting portion 216 are connected with each other by an inclined connecting portion 217.

The mounting portion 216 of the sensor holder 21 is fixed to a given fixing portion 15 by a fitting member 22 via a set plate 71. The portion of the sensor holder 21 extending from the bow-shaped surface 215 to the inclined connecting portion 217 is in part cut and raised thereby providing a cut-and-raised piece 218. A sensor base plate 72 is held and fixed between the cut-and-raised piece 218 and inclined connecting portion 217. The set plate 71 is in part pressed against the sensor base plate 72 thereby preventing the sensor base plate 72 from slipping out of position.

In order to secure the space portion 24 within the bow-shaped surface 215, an elastic thin film 25 is provided on the inner surface of the bow-shaped surface 215. The elastic thin film 25 is elastically deformable along the surface direction of the bow-shaped surface 215. A heat sensitive element 26 is disposed at a portion of the back surface of the elastic thin film 25 which is opposed to the apex (axially symmetric position) of the bow-shaped surface 215.

The temperature sensor is mounted so that the portion of the elastic thin film 25 of the sensor unit 23 in which the heat sensitive element 26 is disposed and its peripheral portions are in elastic contact with the heating roller 11 serving as the body to be measured.

In this mounting state, the distance s between the heat sensitive element 26 of the space portion 24 and the bent portion of the bow-shaped surface 215 is preferably set in the range of 1 to 5 mm.

Here, it was confirmed that the present embodiment provides an action substantially similar to the first embodiment (of a type including the bow-shaped surface 211 having an angle shape section) and the temperature followability of the heat sensitive element 26 is slightly enhanced when compared with the first embodiment.

The structures of the second through fourth embodiments can also be applied to the present embodiment.

Eighth Embodiment

Figure 16A:
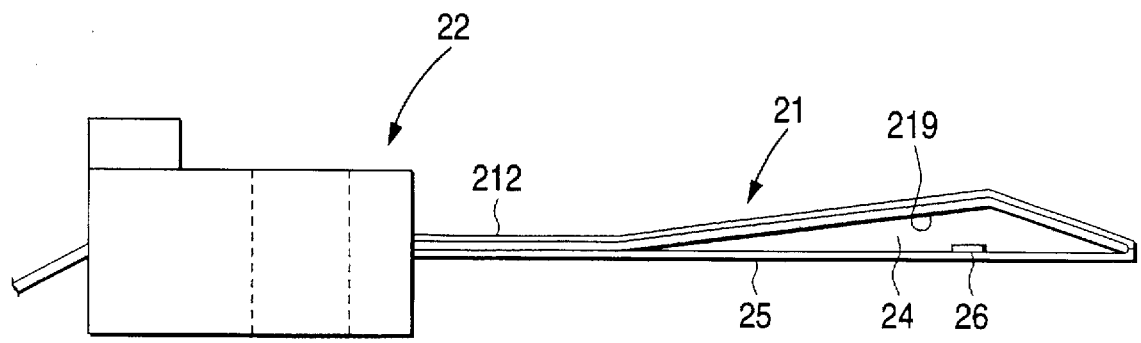
FIGS. 16A and 16B are explanatory views of a temperature sensor according to an eighth embodiment of the invention.
Figure 16B:
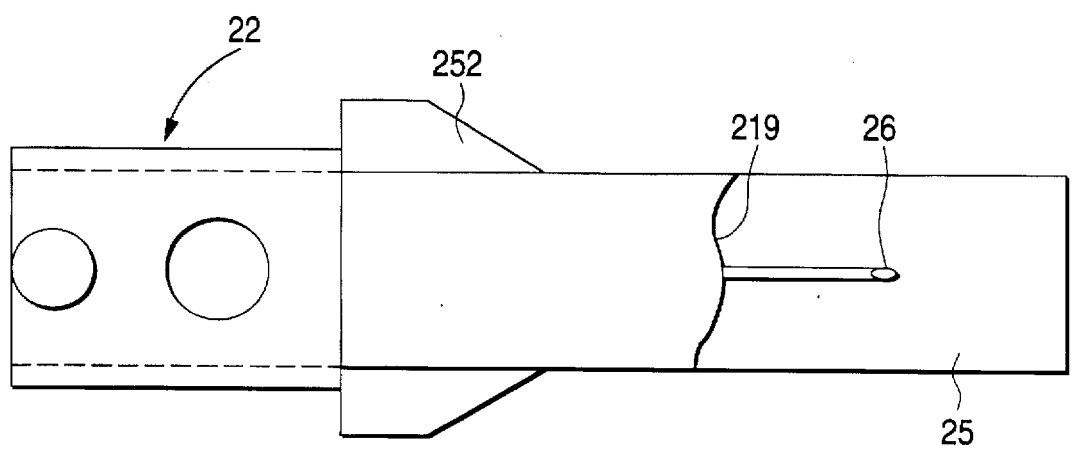

FIGS. 16A and 16B show an eighth embodiment of a temperature sensor according to the present invention. The structural components are similar to those employed in FIG. 9 and are given the same reference numerals. The detailed description thereof is omitted here.

In FIGS. 16A and 16B, the basic structure of the present temperature sensor is similar to that of the modification of the first embodiment as shown in FIG. 9. However, a substantially linear holder plate portion 212 is provided with a bow-shaped surface 219 having a non-isosceles triangle shaped section. An elastic thin film 25 is provided so that a space portion 24 is secured in the bow-shaped surface 219. A heat sensitive element 26 is fitted on a portion of the elastic thin film 25 where reflected heat from the bow-shaped surface 219 is effectively returned. Incidentally, in the present embodiment, the structural components thereof similar to or equivalent to those employed in FIG. 9 are given the same designations and thus the detailed description thereof is omitted here.

The action of this type of apparatus is substantially equal to that of the apparatus as shown in FIG. 9.

Ninth Embodiment

Figure 17:
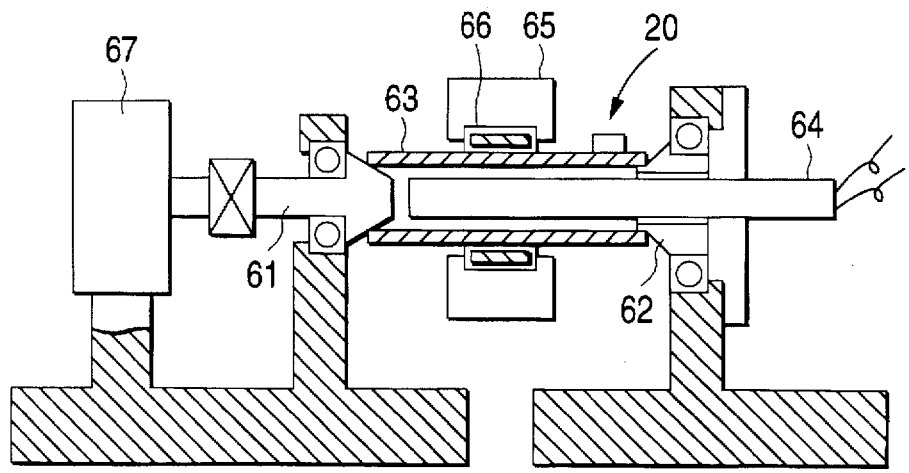
FIG. 17 is an explanatory view of the general structure of a bearing abrasion tester according to an eighth embodiment of the invention.

FIG. 17 shows a bearing abrasion tester as another example of apparatus to which the temperature sensor according to the invention can be applied.

In FIG. 17, referring to the structure and object of the bearing abrasion tester, a shaft 63 having a heater 64 is rotatably supported in two support bearings 61 and 62. A test-piece bearing 66 is mounted in a housing 65. The shaft 63 is engaged with the test-piece bearing 66 and is heated to a given temperature. In this heated condition, the shaft 63 is rotated by means of a driving force from a motor 67 thereby testing the degree of abrasion of the test-piece bearing 66.

In order to control the temperature of the shaft 63, the temperature sensor 20 (any one of the first through eighth embodiments) according to the present invention is built into the shaft 63. That is, in the embodiments first through eighth, the present invention is applied to sense or detect the temperature of the fixing apparatus. Whereas, in the present embodiment, the present invention is applied to detect the temperature of the bearing abrasion tester.

EXAMPLES

First Example

By use of a temperature sensor according to the seventh embodiment which is the temperature sensor of a type shown in FIG. 15. That is, a type that includes a bow-shaped surface having a smoothly curved surface, s=3 mm, and further including the aluminum foil 41, with the heat capacity of the heat sensitive element 26 and elastic thin film 25 being set for 0.01 J/°C. Using this structure, a temperature followability test and a peripheral environment variation test were conducted.

Figure 18:
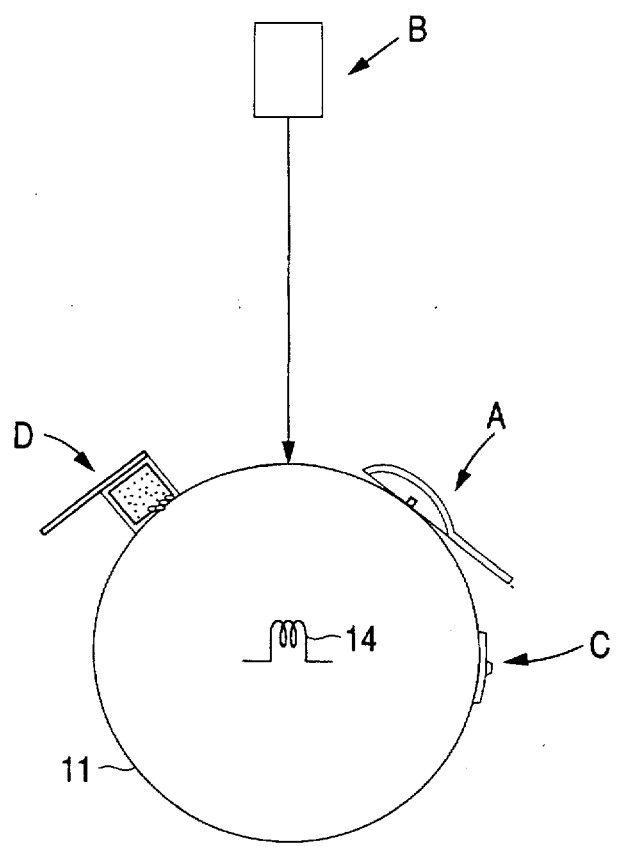
FIG. 18 is an explanatory view of a tester according to a first example of the invention.
Figure 25:
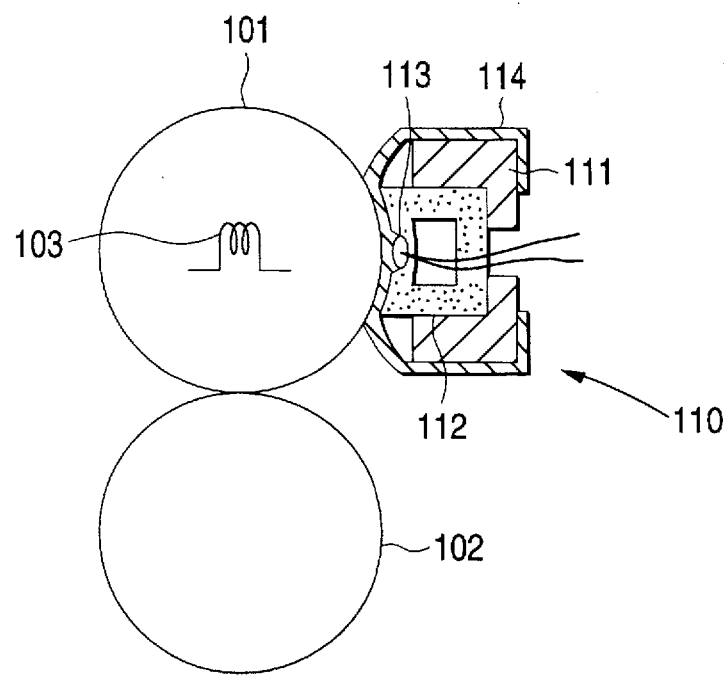
FIG. 25 is an explanatory view of an example of a conventional temperature sensor.
Figure 26:
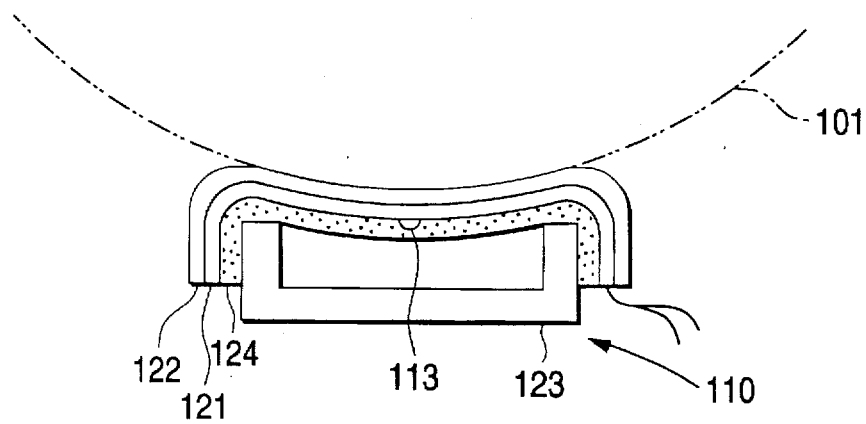
FIG. 26 is an explanatory view of a further example of a conventional temperature sensor.
Figure 27:
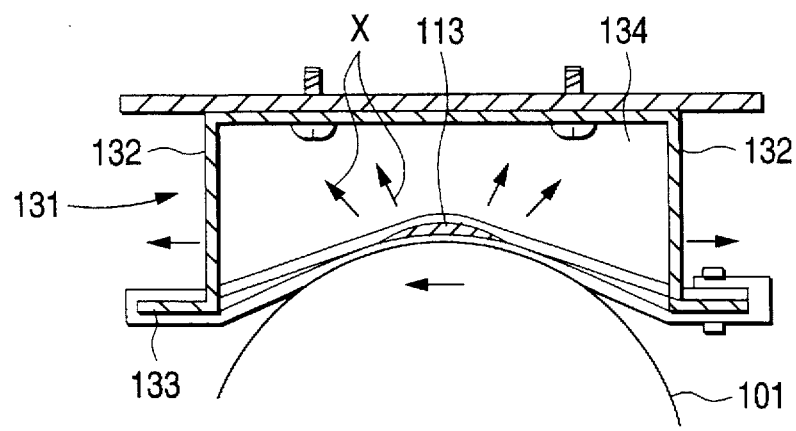
FIG. 27 is an explanatory view of a still further example of a conventional temperature sensor; and, FIG. 28 is an explanatory view of a yet further example of a conventional temperature sensor.
Figure 28:
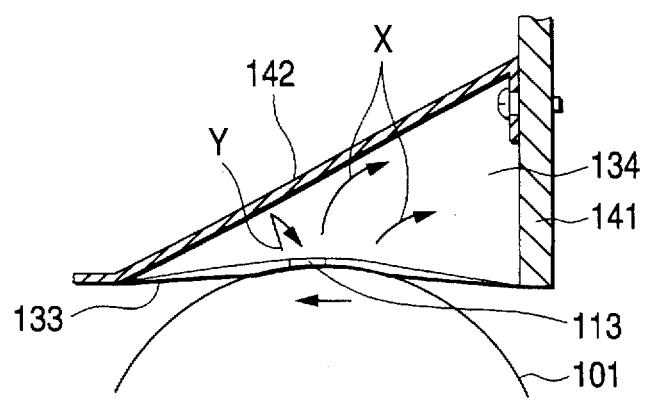

As shown in FIG. 18, a temperature sensor was set with respect to a Fe system thin heating roller 11. Further, as comparative examples, a non-contact infrared thermometer B made by Keyence Corporation, a temperature sensor C having a CA thermocouple bonded directly thereto and a sponge-type temperature sensor D shown in FIG. 25, respectively was set. After then, the heating roller 11 was heated by a heater 14. Here, the emissivity of the non-contact infrared thermometer B was set by the temperature sensor C.

Figure 19:
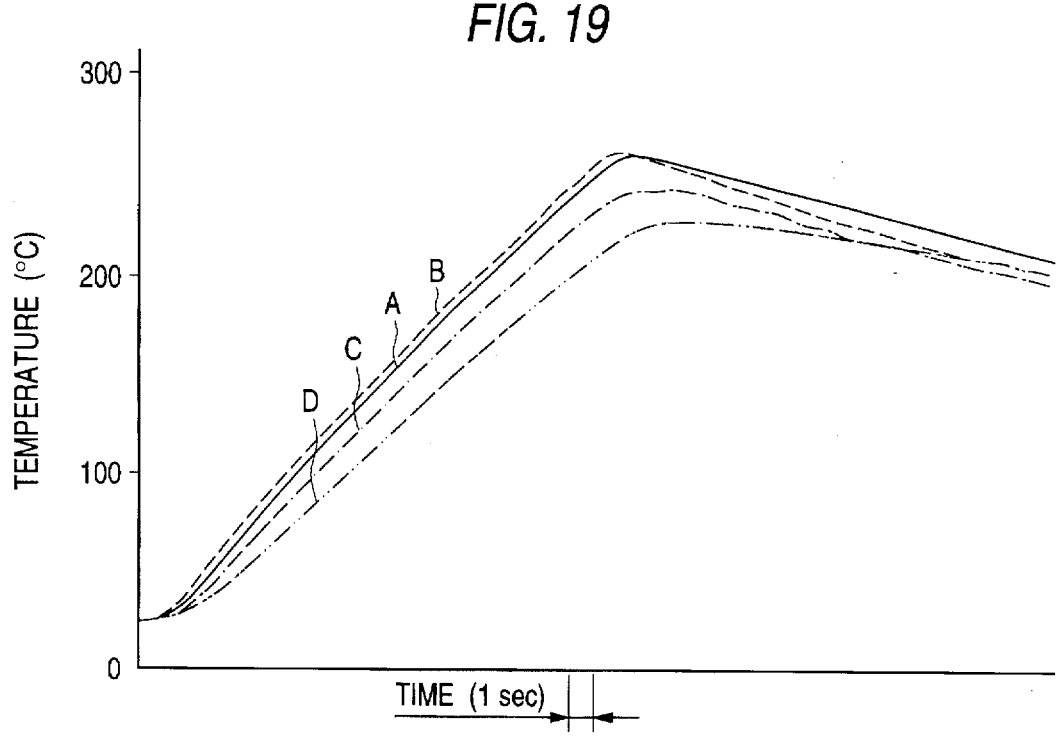
FIG. 19 is a graphical representation of the temperature followability test results respectively obtained by the first example and comparative examples.

In FIG. 19, a graphical representation in which the variations in the temperature of the respective temperature sensors A to D are plotted is shown. According to FIG. 19, the infrared thermometer B is the fastest in both rising and falling speeds. In particular, after it rises, it goes into a stable temperature range in which it shows the same temperature as the temperature sensor C. In light of the performance of the thermometer it shows the surface temperature of the heating roller most accurately.

The temperature sensor A is the second fastest in the rising speed and shows the highest temperature after it goes into a stable temperature range. This points out that it has a high performance most nearest to that of the infrared thermometer B. The temperature in the stable range shows that it displays a temperature which is more correct than the temperature displayed by the CA thermocouple bonded directly to the heating roller.

Also, the temperature rising characteristic of the temperature sensor C of a directly bonded thermocouple type is slower than that of the temperature sensor A according to the present embodiment. The temperature rising characteristic of the temperature sensor D of a sponge type is the slowest.

These tests show that the temperature sensor A of the present embodiment type is good in both the temperature rising characteristic and the temperature followability.

Figure 20:
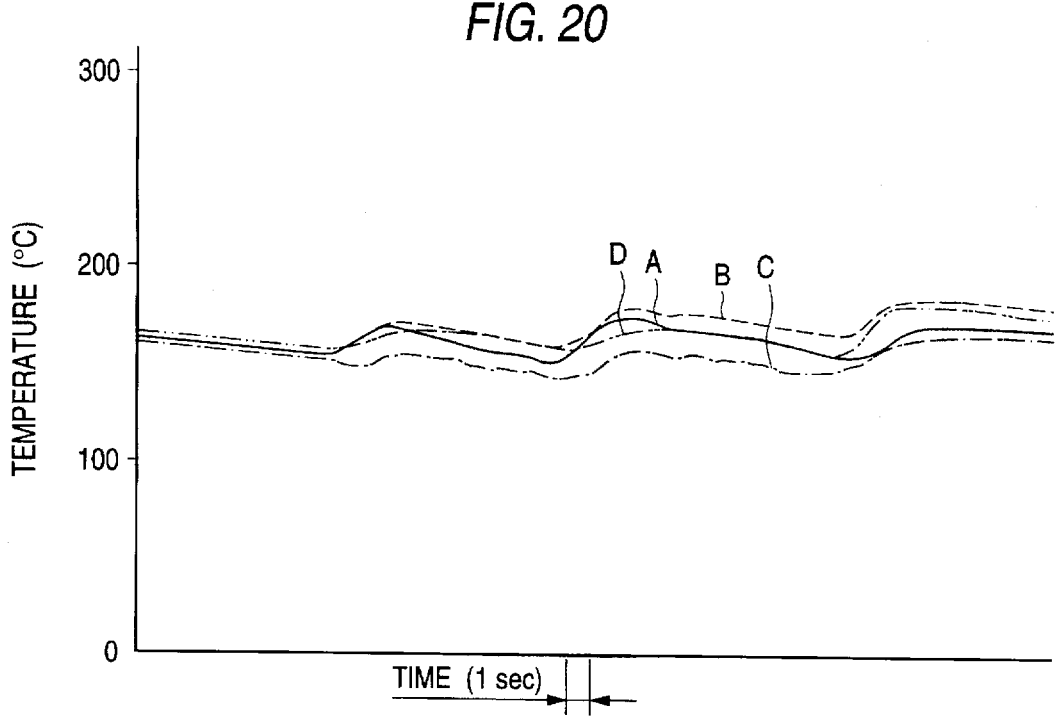
FIG. 20 is a graphical representation of the peripheral environment variation test results respectively obtained by the first example and comparative examples.

Further, when the air was forcibly fed to the heating roller 11 portion by use of a fan at the time of entrance of the stable temperature range, results as shown in FIG. 20 were obtained. In FIG. 20, the temperature sensor A of the present embodiment type and the infrared thermometer B show substantially the same results. The temperature sensor C of a directly bonded thermocouple, however, shows such variations as caused by the air flow.

Although the temperature sensor D of a sponge type does not show such variations as caused by the air flow like the temperature sensor C of a directly bonded thermocouple, the temperature sensor D is slower in the temperature followability than the temperature sensor A of the present embodiment type and the infrared thermometer B.

Second Example

By using a temperature sensor according to the second embodiment (which is a temperature sensor of a type shown in FIG. 8. That is, a type which includes a bow-shaped surface having an angle shape section, and further includes the aluminum foil 41, with the heat capacity of the heat sensitive element 26 and elastic thin film 25 being set for 0.01 J/°C.) to vary the distance s (the size of the space portion 24) between the heat sensitive element 26 and the bent portion of the bow-shaped surface 211, a temperature followability test was conducted.

However, in the present test, under the condition in which the air is forcibly fed by an electric fan, the temperature sensor A was compared with the comparative examples B and C (that is, the infrared thermometer type B and the temperature sensor C of a directly bonded thermocouple).

In FIGS. 21 to 24, the rising temperature characteristics of the temperature sensors A to C are shown. These characteristics were obtained when the heating roller 11 was heated by the heater 14 while the above-mentioned distance s of the temperature sensor A according to the present invention was set for 2 mm, 5 mm, 6 mm, and 0 mm (contact state) respectively.

Figure 21:
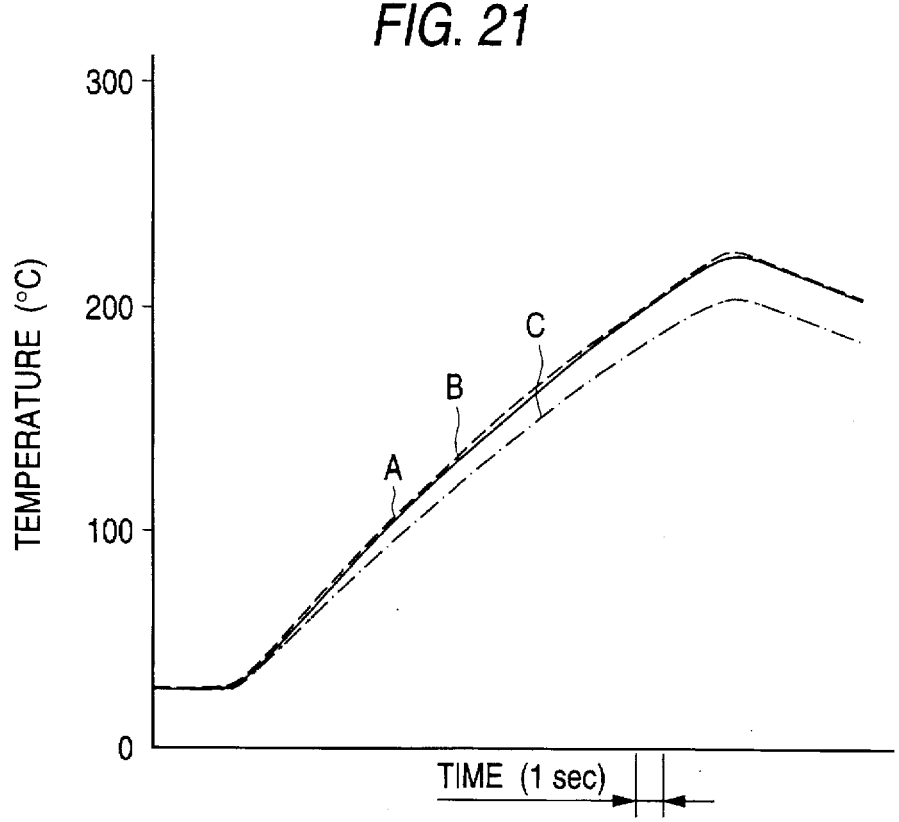
FIG. 21 is a graphical representation of the temperature followability test results respectively obtained by a second example (s=2 mm) of the invention and comparative examples.
Figure 22:
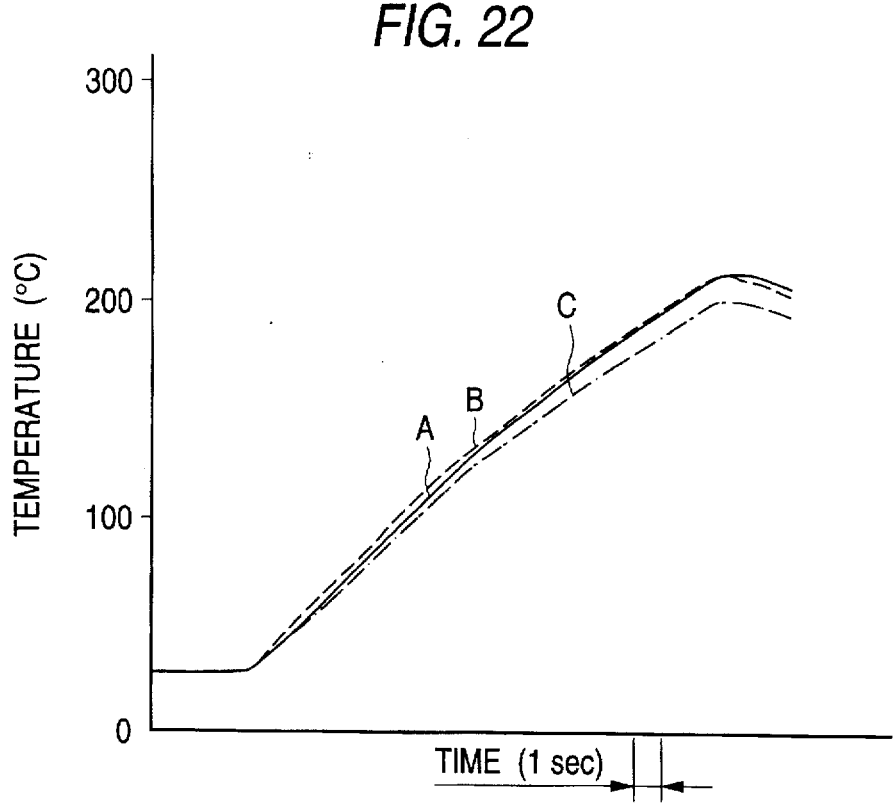
FIG. 22 is a graphical representation of the temperature followability test results respectively obtained by a second example (s=5 mm) of the invention and comparative examples.

According to FIGS. 21 and 22, the rising temperature characteristic of the temperature sensor A is approximate to that of the infrared thermometer B.

Figure 23:
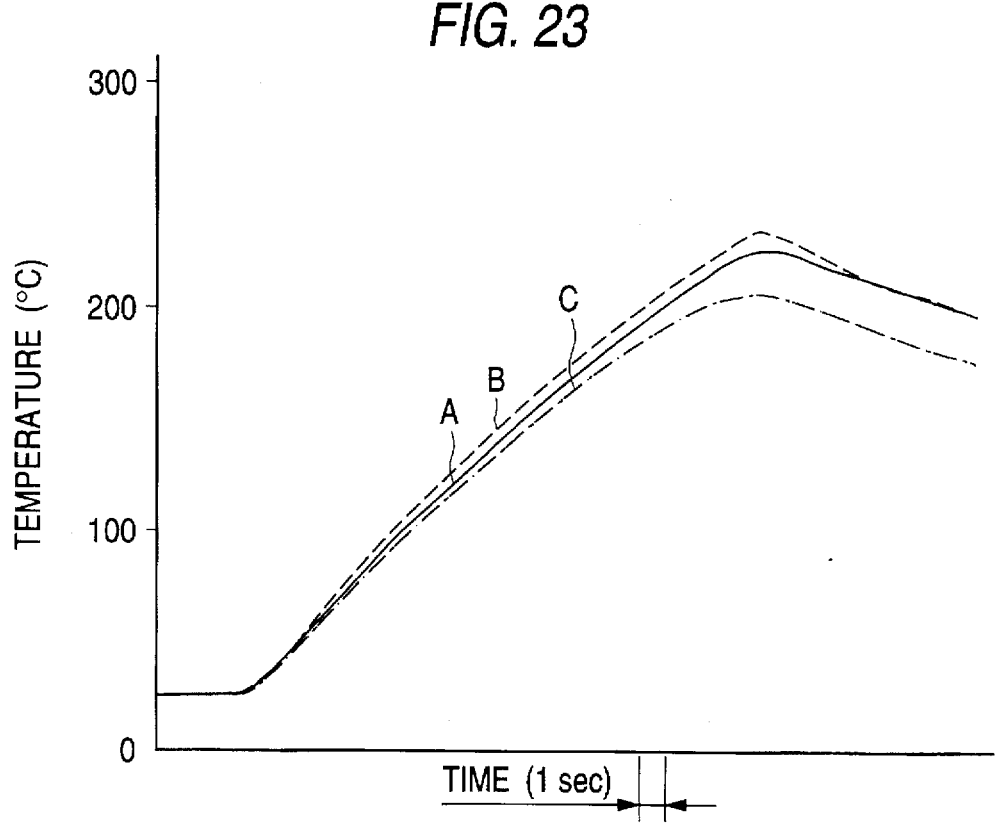
FIG. 23 is a graphical representation of the temperature followability test results respectively obtained by a second example (s=6 mm) of the invention and comparative examples.

According to FIG. 23, the rising temperature characteristic of the temperature sensor A is at a distance from that of the infrared thermometer B when compared with FIGS. 21 and 22. When the heating roller 11 was heated by the heater 14 while the distance s of the temperature sensor A of the present embodiment type was set for less than 1 mm, similar to FIG. 23, the rising temperature characteristic of the temperature sensor A was at a distance from that of the infrared thermometer B.

Figure 24:
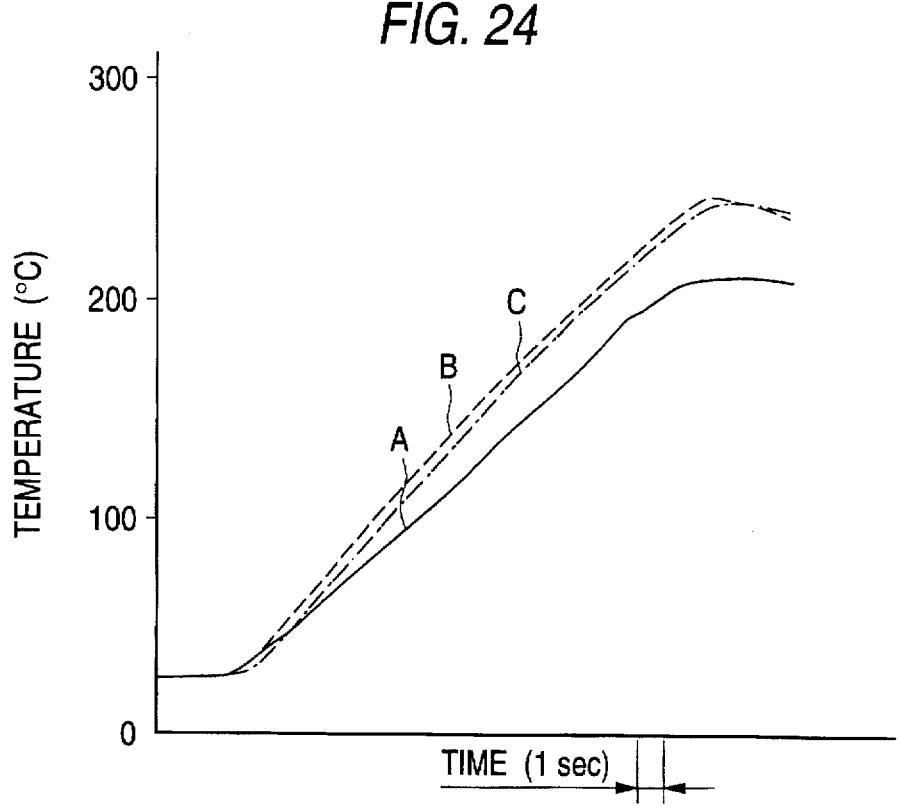
FIG. 24 is a graphical representation of the temperature followability test results respectively obtained by a second example (s=0 mm) of the invention and comparative examples.

According to FIG. 24, the rising temperature characteristic of the temperature sensor A of the present embodiment type is inferior to that of the temperature sensor C of a directly bonded thermocouple.

Therefore, the results of the above test show that the size of the space portion 24 has a great influence on keeping the temperature followability of the temperature sensor at a high level and that the temperature sensor A is preferably set in the range of the order of 1 mm≦s≦5 mm in order to keep the temperature followability at a good level.

The above tendency (i.e., good temperature followability range: 1 mm≦s≦5 mm) was found in the first embodiment type as well.

Third Example

By using the temperature sensor according to the first embodiment which is the temperature sensor of a FIG. 3, a temperature followability test and a peripheral environment variation test were conducted.

In the present tests, when compared with the test of first embodiment type (including the aluminum foil 41), although the temperature followability was found slightly lower, there were obtained substantially the same results as in FIGS. 19 and 20.

Fourth Example

By using the temperature sensor according to the third embodiment (FIG. 11) a temperature followability test and an endurance test were conducted. According to the results of the present tests, when compared with the third example, the temperature followability of the fourth example type sensor is little different from the third example type sensor. The life of the fourth example type sensor is extended far longer than the test third embodiment sensor.

As has been described heretofore, according to the invention, a thin film is strung and laid between a support member and a bow-shaped surface through a space portion. A heat sensitive element is disposed on the space portion side of the thin film. The thin film is brought into contact with a body to be measured thereby keeping the heat sensitive element in good contact with the body to be measured. Due to this, the need for a hollow elastic body and a hold member for holding the hollow elastic body which are conventionally used are eliminated, thereby reducing the size of the whole of the temperature sensor.

Also, since the support member that supports the heat sensitive element is the thin film itself, the space portion can be expected to provide a heat insulating effect. Further, there is little possibility that the heat of the heat sensitive element can be transmitted in the surface direction through the thin film. For these reasons, when compared with the hollow elastic body or sheet-shaped elastic body and a member for supporting such elastic body which are employed in the conventional temperature sensor, it is possible to reduce greatly the heat capacity of a member to which the heat from the heat sensitive element is transferred. Accordingly it is possible to keep good temperature followability of the heat sensitive element with respect to the sudden temperature change of the body to be measured.

Because the support member is structured to include a bow-shaped surface having a substantially axially symmetric shape and the heat sensitive element is fixed to a portion of the thin film which is strung and placed on the space portion side and is opposed to the bow-shaped surface, even if the heat radiated from the back surface of the heat sensitive element and the heat having passed through the body to be measured are radiated into the space portion, after the most part of the radiation heat is reflected by the inner surface of the space portion, the reflected heat can be moved back again to the heat sensitive element side collectively.

This makes it possible to make efficient use of the heat to be given to the heat sensitive element for temperature sensing. As a result, even if the heat can be lost from the heat sensitive element due to the air flow when the body to be measured is rotated, the loss of the heat can be compensated effectively thereby restricting the loss of the heat from the heat sensitive element to a minimum. Therefore, it is possible to effectively prevent the deterioration of the temperature followability of the heat sensitive element due to the peripheral environment variations.

Also, if a thin film is composed of an elastic thin film which is elastically deformable along the surface direction thereof, and the deformed portion of the elastic thin film is absorbed by the space portion to minimize a reaction which provides resistance with respect to the body to be measured when the elastic thin film is elastically deformed, then a stabilized contact condition can be obtained between the body to be measured and the heat sensitive element even if the heat sensitive element provides a low contact pressure with respect to the body to be measured. Accordingly, the temperature sensing performance to be provided by the heat sensitive element can be kept at a good level. It is also possible to effectively prevent the surface of the body to be measured from being damaged.

Further, by setting the space portion in the optimum size, the passage of the air flow within the space portion can be restricted even if the peripheral environment varies; even if the air flow occurs. For this reason, even the heat loss of the heat sensitive element can also be restricted effectively, which in turn makes it possible to prevent the deterioration of the temperature followability of the heat sensitive element due to the peripheral environment variations.

If the distance between the heat sensitive element and the bow-shaped surface opposed to the heat sensitive element is set in the range of 1 mm to 5 mm, the deterioration of the temperature followability of the heat sensitive element due to the peripheral environment variations can be prevented simply and positively.

Still further, in the present invention, if there is used a bow-shaped surface having a smoothly curved surface, then the inner surface of the bow-shaped surface can be optimized in shape, which makes it possible to make effective use of substantially the whole area of the bow-shaped surface inner surface as a heat reflecting surface for the heat sensitive element. This in turn makes it possible to secure a sufficient quantity of heat to be returned back to the heat sensitive element, thereby effectively preventing the deteriorated temperature followability of the heat sensitive element due to the peripheral environment variations.

Further, if the space portion side of the heat sensitive element is coated with a thermal conductive sheet such as aluminum foil, then the radiation of heat from the heat sensitive element can be reduced further, so that the response performance of the heat sensitive element can be kept in a better level.

Moreover, if the heat sensitive element is fixedly secured to the elastic thin film through a thermal conductive protect plate formed of aluminum, phosphorous bronze or copper, then the life of the temperature sensor can be extended without sacrificing the response performance of the heat sensitive element.

In addition, a temperature sensor according to the invention can be easily incorporated into a fixing apparatus which includes a body to be measured including a curved surface, that is, a target device the temperature of which is to be sensed.

What is claimed is:

1. A temperature sensor for sensing a temperature of a curved-surface body, said temperature sensor comprising:
   a flexible support member having ends and a first flexible bow-shaped surface having ends, the ends of the support member also being substantially the ends of the first bow-shaped surface;
   a thin film strung and laid between the ends of said support member, said thin film forming a second bow-shaped surface being in substantial contact with the curved-surface body, regardless of a pressure applied to said support member, said second surface substantially conforming to the curved-surface body; and
   a heat sensitive element disposed at a portion of said thin film, said portion being opposed to said first bow-shaped surface, said heat sensitive element being spaced apart from said first bow-shaped surface.

2. A temperature sensor according to claim 1, wherein said thin film is elastic.

3. A temperature sensor according to claim 1, wherein first said bow-shaped surface is heat-reflective.

4. A temperature sensor according to claim 1, wherein said support member has a plate shape, and said first bow-shaped surface is formed by bending said plate-shaped support member.

5. A temperature sensor according to claim 1, wherein said heat sensitive element is disposed substantially at a center of said thin film.

6. A temperature sensor according to claim 1, wherein said bow-shaped surface of said support member is formed in a smoothly varying curved surface shape.

7. A temperature sensor according to claim 1, further comprising a thermal conductive sheet coating between said heat sensitive element and said thin film.

8. A temperature sensor according to claim 1, wherein first said heat sensitive element is provided on said thin film via a thermal conductive sheet.

9. A temperature sensor according to claim 1, wherein said heat sensitive element is provided on said thin film via a bonding sheet.

10. A temperature sensor according to claim 1, wherein a distance of a space portion between said heat sensitive element and said first bow-shaped surface opposed to said heat sensitive element is in the range of 1 to 5 mm.

11. A temperature sensor according to claim 1, wherein said thin film is heat resistant.

12. A temperature sensor according to claim 1, wherein a thickness of said thin film is in the range of 25 μm to 50 μm.

13. A method of using a temperature sensor for sensing a temperature of a curved-shaped body, said temperature sensor comprising:
   a flexible support member having ends and a first flexible bow-shaped surface having ends, the ends of the support member also being substantially the ends of the first bow-shaped surface;
   a thin film strung and laid between the ends of said support member, said thin film forming a second bow-shaped surface being in substantial contact with the curved surface body, wherein said second bow-shaped surface substantially conforms to the curved-surface body; and
   a heat sensitive element disposed at a portion of said thin film, said portion being opposed to said first bow-shaped surface, said heat sensitive element being spaced apart from said first bow-shaped surface;

said method comprising:
   contacting a part of said thin film, said part including an area of said heat sensitive element, with said curved-surface body to be measured, regardless of a pressure applied to said support member; and
   sensing the temperature of said curved-surface body while said area contacts said curved-surface body.

14. In combination, a toner fixing apparatus and a toner temperature sensor, the toner fixing apparatus comprising:
   a heating roller having a curved-surface;
   the temperature sensor for sensing the temperature of the curved-surface, said temperature sensor comprising:
      a flexible support member having ends and a first flexible bow-shaped surface having ends, the ends of the support member also being substantially the ends of the first bow-shaped surface;
      a thin film strung and laid between both ends of said support member and forming a second bow-shaped surface being in substantial contact with the curved-surface, regardless of a pressure applied to said support member, said second bow-shaped surface substantially conforming to the curved surface body; and
      a heat sensitive element disposed at a portion of said thin film, said portion being opposed to said first bow-shaped surface, said heat sensitive element being spaced apart from said first bow-shaped surface.

* * * * *